US010347127B2

(12) United States Patent
Droz et al.

(10) Patent No.: US 10,347,127 B2
(45) Date of Patent: *Jul. 9, 2019

(54) DRIVING MODE ADJUSTMENT

(71) Applicant: Waymo LLC, Mountain View, CA (US)

(72) Inventors: Pierre-yves Droz, Mountain View, CA (US); Jiajun Zhu, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 13/772,615

(22) Filed: Feb. 21, 2013

(65) Prior Publication Data

US 2014/0236414 A1 Aug. 21, 2014

(51) Int. Cl.
*G01S 5/16* (2006.01)
*G08G 1/16* (2006.01)
(Continued)

(52) U.S. Cl.
CPC ......... *G08G 1/161* (2013.01); *B60W 50/0098* (2013.01); *G06K 9/00805* (2013.01);
(Continued)

(58) Field of Classification Search
CPC .......... G06K 9/00791; G06K 9/00805; G06K 9/00825; G08B 21/02; G08G 1/165;
(Continued)

(56) References Cited

U.S. PATENT DOCUMENTS 6,233,515 B1 * 5/2001 Engelman et al. ............. 701/96
6,392,564 B1 * 5/2002 Mackey et al. ............... 340/937
(Continued)

FOREIGN PATENT DOCUMENTS

EP 0884666 12/1998
EP 2316705 5/2011
(Continued)

OTHER PUBLICATIONS

International Searching Authority, International Search Report for PCT/US2014/011779 dated May 8, 2014, 9 pages.

*Primary Examiner* — Adam D Tissot
*Assistant Examiner* — Aaron C Smith
(74) *Attorney, Agent, or Firm* — McDonnell Boehnen Hulbert & Berghoff LLP

(57) ABSTRACT

A computing device may be configured to receive sensor information indicative of respective characteristics of vehicles on a road of travel of a first vehicle. The computing device may be configured to identify, based on the respective characteristics, a second vehicle that exhibits an aggressive driving behavior manifested as an unsafe or unlawful driving action. Also, based on the respective characteristics, the computing device may be configured to determine a type of the second vehicle. The computing device may be configured to estimate a distance between the first vehicle and the second vehicle. The computing device may be configured to modify a control strategy of the first vehicle, based on the aggressive driving behavior of the second vehicle, the type of the second vehicle, and the distance between the first vehicle and the second vehicle; and control the first vehicle based on the modified control strategy.

20 Claims, 6 Drawing Sheets

(51) Int. Cl.
*B60W 50/00* (2006.01)
*G08G 1/015* (2006.01)
*G06K 9/00* (2006.01)
*G01S 17/93* (2006.01)

(52) U.S. Cl.
CPC ............ *G08G 1/015* (2013.01); *G08G 1/166* (2013.01); *B60W 2050/0075* (2013.01); *B60W 2420/42* (2013.01); *B60W 2550/308* (2013.01); *G01S 17/936* (2013.01)

(58) Field of Classification Search
CPC ........ G08G 1/161; G08G 1/166; G08G 1/015; B60Q 1/00; H04N 7/18; B60W 30/00; B60W 50/14; B60W 50/0098; B60W 2050/0075; B60W 2420/42; B60W 2550/308; G01S 17/936; G01S 5/16; G05D 1/0246; G05D 1/0274; G05D 1/0272; G05D 1/0231
See application file for complete search history.

(56) References Cited

U.S. PATENT DOCUMENTS

| | | | |
|---|---|---|---|
| 7,124,027 B1 * | 10/2006 | Ernst et al. | 701/301 |
| 7,633,383 B2 * | 12/2009 | Dunsmoir | G06K 9/00805 340/435 |
| 7,765,066 B2 | 7/2010 | Braeuchle et al. | |
| 8,160,772 B2 * | 4/2012 | Ito et al. | 701/36 |
| 8,195,394 B1 * | 6/2012 | Zhu et al. | 701/514 |
| 8,258,934 B2 * | 9/2012 | Filev et al. | 340/435 |
| 8,260,539 B2 | 9/2012 | Zeng | |
| 8,660,778 B2 | 2/2014 | Taguchi | |
| 8,706,394 B2 | 4/2014 | Trepagnier et al. | |
| 9,146,898 B2 * | 9/2015 | Ihlenburg | G06F 17/00 |
| 2005/0131597 A1 * | 6/2005 | Raz | G07C 5/085 701/29.1 |
| 2007/0043491 A1 * | 2/2007 | Goerick et al. | 701/41 |
| 2008/0167820 A1 * | 7/2008 | Oguchi et al. | 701/301 |
| 2009/0037088 A1 | 2/2009 | Taguchi | |
| 2009/0051516 A1 * | 2/2009 | Abel et al. | 340/436 |
| 2010/0082195 A1 | 4/2010 | Lee et al. | |
| 2010/0104199 A1 * | 4/2010 | Zhang | G06K 9/00798 382/199 |
| 2010/0106356 A1 | 4/2010 | Trepagnier et al. | |
| 2011/0282581 A1 * | 11/2011 | Zeng | G01S 17/936 701/301 |
| 2012/0022716 A1 | 1/2012 | Kitahama et al. | |
| 2012/0083960 A1 * | 4/2012 | Zhu et al. | 701/23 |
| 2013/0151058 A1 * | 6/2013 | Zagorski | B60W 30/09 701/23 |

FOREIGN PATENT DOCUMENTS

| | | |
|---|---|---|
| JP | 2000-242898 | 9/2000 |
| JP | 2006-085285 | 3/2006 |
| JP | 2009-37561 | 2/2009 |
| JP | 2010-067235 | 3/2010 |
| JP | 2012-507088 | 3/2012 |
| KR | 10-2007-0072917 | 7/2007 |
| KR | 10-2010-0028279 | 3/2010 |
| WO | WO 2006/047297 A2 | 5/2006 |
| WO | WO 2010/048611 A1 | 4/2010 |

* cited by examiner

COMPUTER PROGRAM PRODUCT 500

SIGNAL BEARING MEDIUM 501

PROGRAM INSTRUCTIONS 502

- RECEIVING, BY A COMPUTING DEVICE, SENSOR INFORMATION INDICATIVE OF ONE OR MORE RESPECTIVE CHARACTERISTICS OF VEHICLES ON A ROAD OF TRAVEL OF A FIRST VEHICLE

- IDENTIFYING, FROM THE VEHICLES, BASED ON THE ONE OR MORE RESPECTIVE CHARACTERISTICS, A SECOND VEHICLE THAT EXHIBITS AN AGGRESSIVE DRIVING BEHAVIOR MANIFESTED AS AN UNSAFE OR UNLAWFUL DRIVING ACTION

- DETERMINING, BASED ON THE ONE OR MORE RESPECTIVE CHARACTERISTICS, A TYPE OF THE SECOND VEHICLE

- ESTIMATING A DISTANCE BETWEEN THE FIRST VEHICLE AND THE SECOND VEHICLE

- MODIFYING, USING THE COMPUTING DEVICE, A CONTROL STRATEGY ASSOCIATED WITH A DRIVING BEHAVIOR OF THE FIRST VEHICLE, BASED ON THE AGGRESSIVE DRIVING BEHAVIOR OF THE SECOND VEHICLE, THE TYPE OF THE SECOND VEHICLE, AND THE DISTANCE BETWEEN THE FIRST VEHICLE AND THE SECOND VEHICLE

- CONTROLLING, USING THE COMPUTING DEVICE, THE FIRST VEHICLE BASED ON THE MODIFIED CONTROL STRATEGY

| COMPUTER READABLE MEDIUM 503 | COMPUTER RECORDABLE MEDIUM 504 | COMMUNICATIONS MEDIUM 505 |

FIGURE 5

DRIVING MODE ADJUSTMENT

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to detection of nearby aggressive drivers and adjustment of driving modes. In one aspect, the present application describes a method. The method may comprise receiving, by a computing device, sensor information indicative of one or more respective characteristics of vehicles on a road of travel of a first vehicle. The method also may comprise identifying, from the vehicles, based on the one or more respective characteristics, a second vehicle that exhibits an aggressive driving behavior manifested as an unsafe or unlawful driving action. The method also may comprise determining, based on the one or more respective characteristics, a type of the second vehicle. The method further may comprise estimating a distance between the first vehicle and the second vehicle. The method also may comprise modifying, using the computing device, a control strategy associated with a driving behavior of the first vehicle, based on the aggressive driving behavior of the second vehicle, the type of the second vehicle, and the distance between the first vehicle and the second vehicle; and controlling, using the computing device, the first vehicle based on the modified control strategy.

In another aspect, the present application describes a non-transitory computer readable medium having stored thereon instructions that, upon execution by a computing device, cause the computing device to perform functions. The functions may comprise receiving sensor information indicative of one or more respective characteristics of vehicles on a road of travel of a first vehicle. The functions also may comprise identifying, from the vehicles, based on the one or more respective characteristics, a second vehicle that exhibits an aggressive driving behavior manifested as an unsafe or unlawful driving action. The functions further may comprise determining, based on the one or more respective characteristics, a type of the second vehicle. The functions also may comprise estimating a distance between the first vehicle and the second vehicle. The functions further may comprise modifying a control strategy associated with a driving behavior of the first vehicle, based on the aggressive driving behavior of the second vehicle, the type of the second vehicle, and the distance between the first vehicle and the second vehicle; and controlling the first vehicle based on the modified control strategy.

In still another aspect, the present application describes a control system. The control system may comprise at least one processor. The control system also may comprise a memory having stored thereon instructions that, upon execution by the at least one processor, cause the control system to perform functions comprising receiving sensor information indicative of one or more respective characteristics of vehicles on a road of travel of a first vehicle. The functions also may comprise identifying, from the vehicles, based on the one or more respective characteristics, a second vehicle that exhibits an aggressive driving behavior manifested as an unsafe or unlawful driving action. The functions further may comprise determining, based on the one or more respective characteristics, a type of the second vehicle. The functions also may comprise estimating a distance between the first vehicle and the second vehicle. The functions further may comprise modifying a control strategy associated with a driving behavior of the first vehicle, based on the aggressive driving behavior of the second vehicle, the type of the second vehicle, and the distance between the first vehicle and the second vehicle; and controlling the first vehicle based on the modified control strategy.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is a schematic illustrating a conceptual partial view of a computer program, in accordance with an example embodiment.

DETAILED DESCRIPTION

Figure 1:
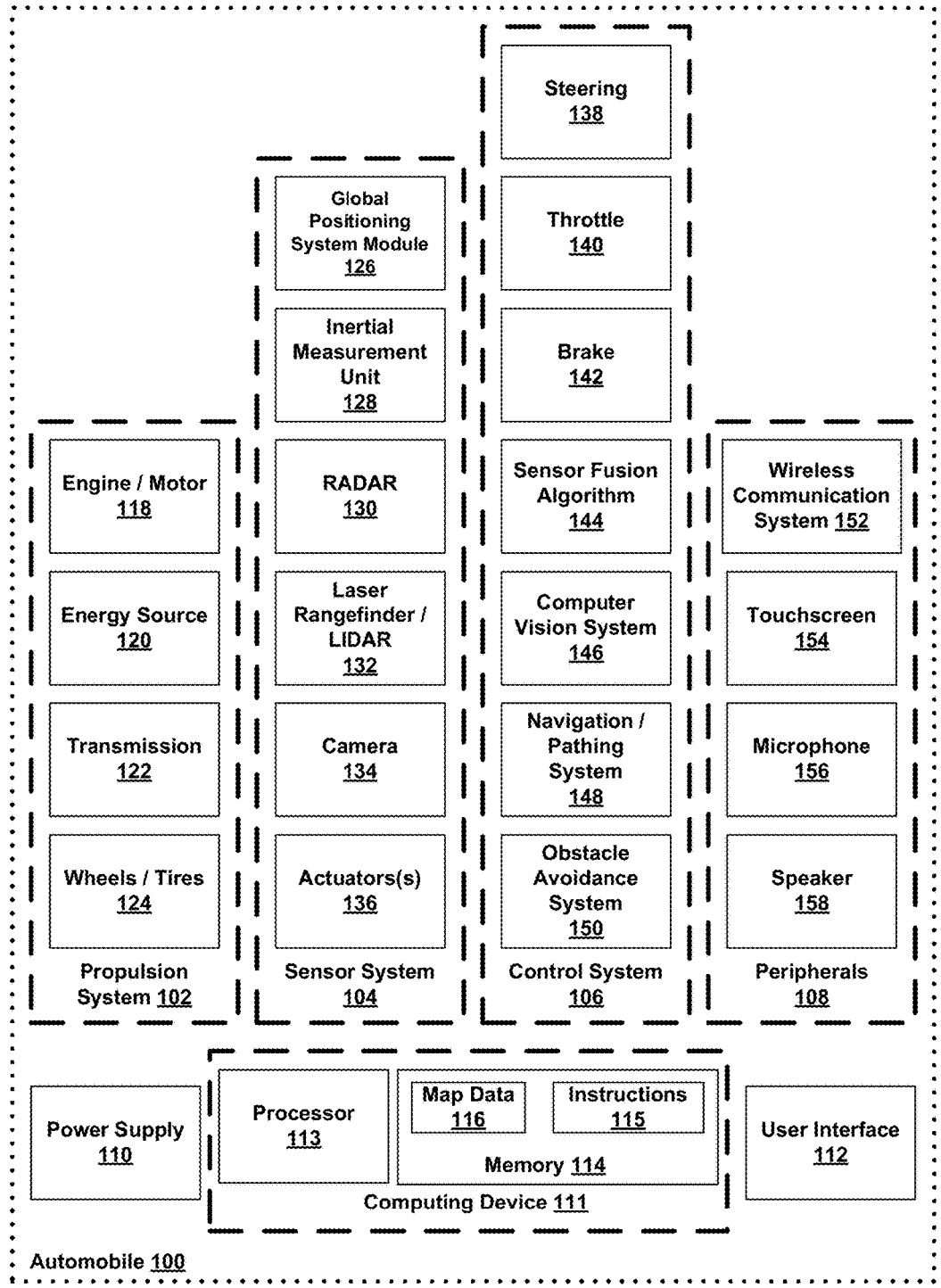
FIG. 1 is a simplified block diagram of an example automobile, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may rely on identifying other vehicles in a vicinity of the autonomous vehicle to determine a safe trajectory. The autonomous vehicle may also identify one or more behaviors of these vehicles to determine a safe control strategy. The autonomous vehicle may be configured to include sensors, such as a camera, a radio detection and ranging (RADAR) device, and a laser rangefinder and/or light detection and ranging (LIDAR) device or other laser sensor. The sensors may be utilized to track the movement of nearby vehicles around the autonomous vehicle. The movement of the nearby vehicles is analyzed to determine behavior patterns of the nearby vehicles. In one example, these behavior patterns can be characterized as aggressive or dangerous driving behaviors associated with the nearby vehicles. Consequently, the autonomous vehicle can be controlled to account for such aggressive vehicles.

Further, the autonomous vehicle may be configured to take into account types of the vehicles in its vicinity. Motorcycle drivers, for example, may potentially be more aggressive than drivers of other vehicles. The autonomous vehicle may also be configured to take into account a distance between the autonomous vehicle and another vehicle exhibiting aggressive driving. For instance, if the distance between the autonomous vehicle and the aggressive vehicle is large, the influence of the aggressive vehicle on the autonomous vehicle driving behavior may be minimal, and vice versa. Based on the aggressive driving of a given vehicle, the type of the given vehicle, and the distance between the autonomous vehicle and the given vehicle, the autonomous vehicle may be configured to modify its control strategy and driving behavior to determine a safe trajectory.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. The microphone 156 may also be configured to receive audio emitted by a horn of another vehicle, for example. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
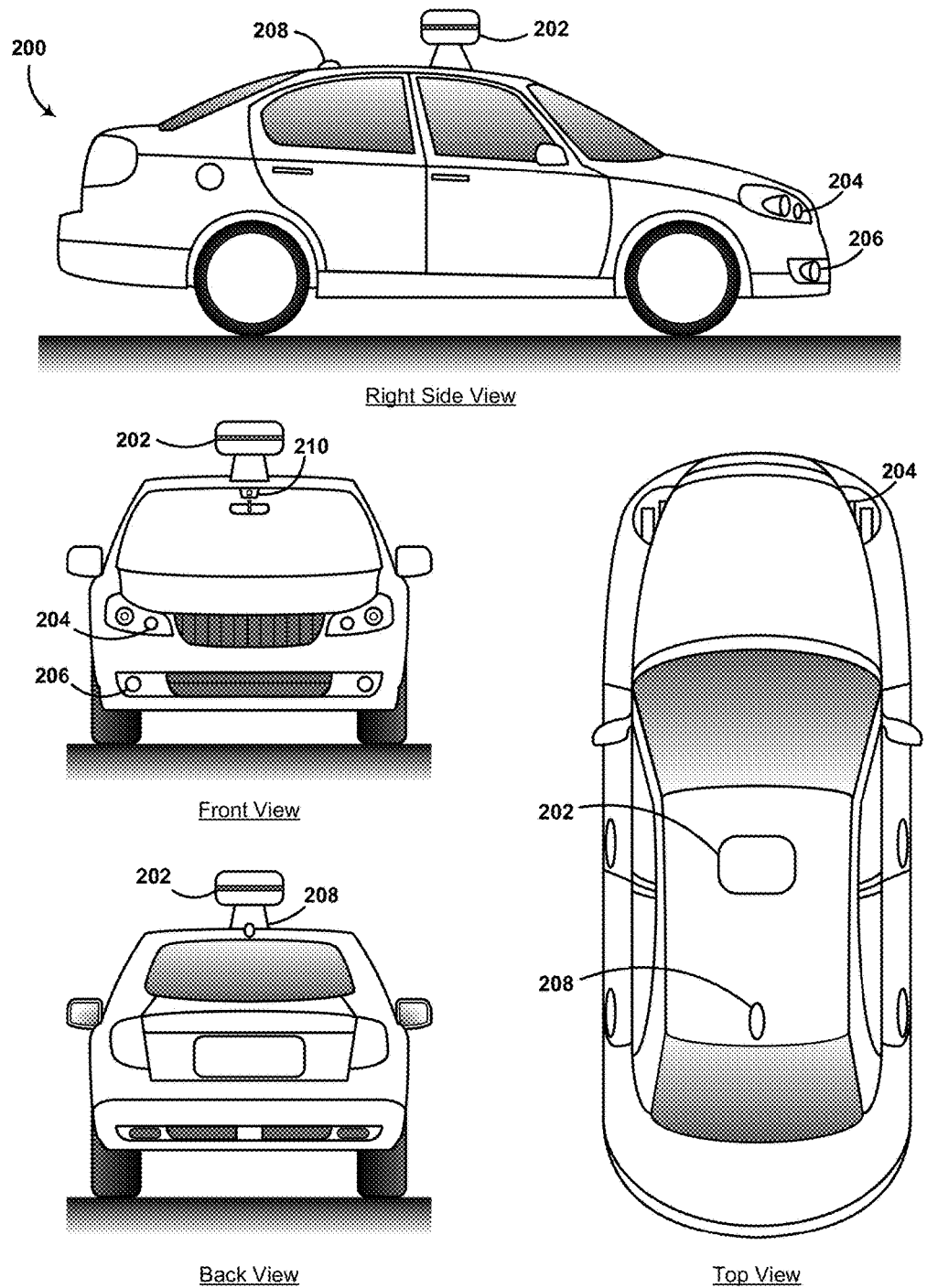
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
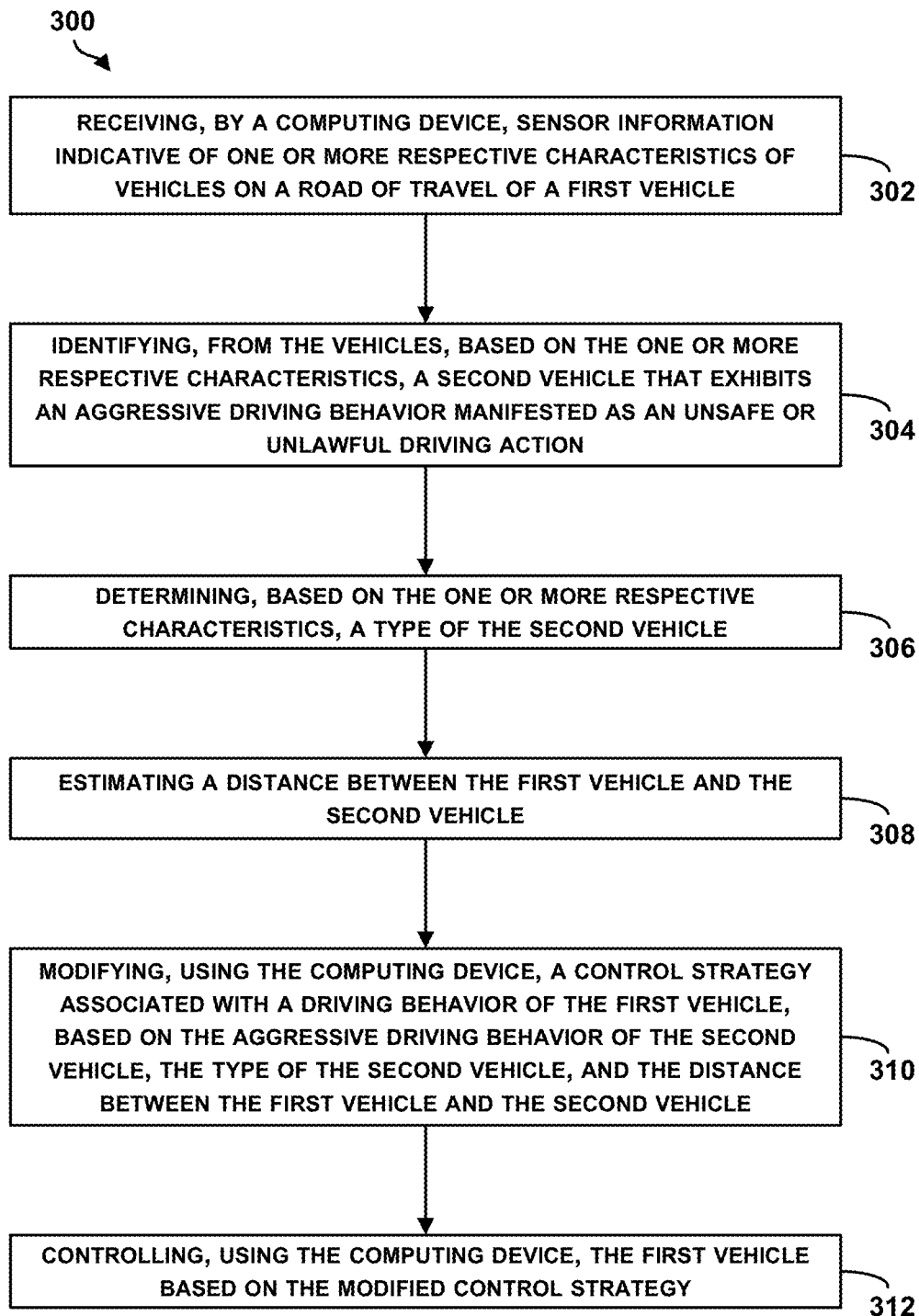
FIG. 3 is a flow chart of a method to detect nearby aggressive drivers and adjust driving modes, in accordance with an example embodiment.

FIG. 3 is a flow chart of a method 300 for controlling vehicle lateral lane positioning, in accordance with an example embodiment.

The method 300 may include one or more operations, functions, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, by a computing device, sensor information indicative of one or more respective characteristics of vehicles on a road of travel of a first vehicle. A controller or a computing device, such as the computing device 111 in FIG. 1, may be onboard the first vehicle or may be off-board but in wireless communication with the first vehicle, for example. Also, the computing device may be configured to control the first vehicle in an autonomous or semi-autonomous operation mode. Further, the computing device may be configured to receive, from sensors and devices coupled to the first vehicle, information associated with, for example, condition of systems and subsystems of the first vehicle, driving conditions, road conditions, movement and behavior of other vehicles on the road, etc.

The computing device may be configured to identify vehicles in adjacent lanes both behind and ahead of the vehicle, motorcycles and cyclists ahead and behind, nearby pedestrians, both on the road and off the road, and any other object that may influence a control strategy for the first vehicle in a lane on the road. In addition to identifying the nearby vehicles, the computing device may be configured to determine respective characteristics of each vehicle of the vehicles. For example, the computing device may be configured to estimate a size (e.g., width and length) of another vehicle, a position of the other vehicle in a respective lane on the road, and how close the other vehicle may be to lane boundaries and respective neighboring vehicles. In some examples, the computing device may be configured to determine relative longitudinal speed and lateral speed, and acceleration/deceleration of the other vehicle with respect to the first vehicle controlled by the computing device. In other examples, the computing device may monitor lane changing patterns of the other vehicle, and behavior of the other vehicle with respect to respective vehicles on the road, such as distance maintained with the respective vehicles, speed with which the other vehicle approaches one of the respective vehicle, etc.

To identify the other vehicles and characteristics of the other vehicles, the computing device may be configured to use the sensors and devices coupled to the first vehicle. For example, a camera, such as the camera 134 in FIG. 1 or the camera 210 in FIG. 2 or any other image-capture device, may be coupled to the first vehicle and may be in communication with the computing device. The camera may be configured to capture images or a video of the road and vicinity of the road. The computing device may be configured to receive the images or video and identify, using image processing techniques for example, vehicles depicted in the image or the video. The computing device may be configured compare portions of the images to templates of vehicles to identify the vehicles and types of the vehicles, for example. Also, the computing device may be configured to analyze the image(s) received from the image-capture device, and determine relative locations of the vehicles with respect to each other, distances between vehicles, etc.

In another example, the computing device may be configured to receive, from a LIDAR device (e.g., the LIDAR unit 132 in FIG. 1) coupled to the first vehicle and in communication with the computing device, LIDAR-based information that may include a three-dimensional (3D) point cloud. The 3D point cloud may include points corresponding to light emitted from the LIDAR device and reflected from objects, such as vehicles on the road or in the vicinity of the road.

As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to a given vehicle or surface by measuring time delay between transmission of a pulse and detection of a respective reflected signal.

In examples, the LIDAR device may be configured to scan an environment surrounding the first vehicle in three dimensions. In some examples, more than one LIDAR device may be coupled to the first vehicle to scan a complete 360° horizon of the first vehicle. The LIDAR device may be configured to provide to the computing device a cloud of point data representing vehicles, which have been hit by the laser, on the road. The points may be represented by the LIDAR device in terms of azimuth and elevation angles, in addition to range, which can be converted to (X, Y, Z) point data relative to a local coordinate frame attached to the first vehicle. Additionally, the LIDAR device may be configured to provide to the computing device intensity values of the light or laser reflected off the objects on the road that may be indicative of a surface type of a given object.

In still another example, the computing device may be configured to receive, from a RADAR device (e.g., the RADAR unit 130 in FIG. 1) coupled to the first vehicle and in communication with the computing device, RADAR-based information relating to location and characteristics of the vehicles on the road. The RADAR device may be configured to emit radio waves and receive back the emitted radio waves that bounced off the surface of the vehicles. The received signals or RADAR-based information may be indicative, for example, of dimensional characteristics of a given vehicle, and may indicate characteristics of motion of the given vehicle (e.g., speed, acceleration, etc.).

Based on sensor information received at the computing device, the computing device may be configured to identify the vehicles nearby the first vehicle and characteristics of the vehicles such as size, speed, acceleration, driving behavior, relative location of a given vehicle with respect to other nearby vehicles and objects (e.g., traffic lights), distances between vehicles, etc. In one example, the computing device may be configured to detect and identify the vehicles and characteristics of the vehicles based on information received from multiple sources such as the image-capture device, the LIDAR device, the RADAR device, etc. However, in another example, the computing device may be configured to identify the vehicles and their characteristics based on information received from a subset of the multiple sources. For example, images captured by the image-capture device may be blurred due to a malfunction of the image-capture device, and in another example, details of the road may be obscured in the images because of fog. In these examples, the computing device may be configured to identify the vehicles based on information received from the LIDAR and/or RADAR units and may be configured to disregard the information received from the image-capture device.

At block 304, the method 300 includes identifying, from the vehicles, based on the one or more respective characteristics, a second vehicle that exhibits an aggressive driving behavior manifested as an unsafe or unlawful driving action. Based on the sensor information received as described at block 302, the computing device may be configured to determine vehicles exhibiting aggressive driving behavior.

Aggressive driving may occur, for example, when a driver commits an unsafe, or unlawful, driving action or a combination of moving traffic violations that can endanger other drivers. An aggressive driver may drive a vehicle in a manner that increases the risk of road accidents. Aggressive driving may be manifested by following another vehicle closely (tailgating), exceeding a speed limit, weaving in and out of traffic, speed up to beat a traffic light, cutting between vehicles to change lanes, excessive lane changing without cause, using the horn excessively, flashing headlights excessively at oncoming traffic, failing to signal intent to pass another vehicle, etc. Herein, "excessively" refers to repeated use for a threshold number of times in a given period of time. Aggressive driving may not cause a road accident, but at least increases the risk of road accidents, and thus may cause other vehicles to be driven in a defensive driving mode. Based on the sensor information received at the computing device, from the multiple sources or sensor coupled to the first vehicle, the computing device may identify a second vehicle that is nearby the first vehicle and exhibits such manifestations of aggressive driving behavior.

At block 306, the method 300 includes determining, based on the one or more respective characteristics, a type of the second vehicle. Based on the characteristics of the vehicle such as size, dimensions, shape, etc., of the second vehicle, the computing device may be configured to estimate determine a type of the second vehicle. For instance, the computing device may be configured to classify the second vehicle as a motorcycle, a truck, a car, etc.

At block 308, the method 300 includes estimating a distance between the first vehicle and the second vehicle. As described above, a LIDAR device, for example, may be configured to emit laser pulses as a beam, and scan the beam to generate two dimensional or three dimensional range matrices. The range matrices may be used to determine distance to a given vehicle or surface by measuring time delay between transmission of a pulse and detection of a respective reflected signal. Similarly, a RADAR device, as described above, may be configured to emit radio waves and receive back the emitted radio waves that bounced off the surface of the second vehicle. The distance between the first vehicle and the second vehicle may be inferred or estimated from the received signals or RADAR-based information by measuring time delay between transmission of a radio wave pulse and detection of a respective reflected wave. Also, the point cloud provided by the LIDAR device to the computing device configured to control the first vehicle may indicate coordinates of the second vehicle with respect to the first vehicle. The computing device may also be configured to determine the distance based on images, captured by a camera coupled to the first vehicle, depicting the second vehicle on the road. The computing device may be configured to have access to parameters of the camera (focal depth, resolution, etc.), and may estimate the distance based on such parameters, location of the camera coupled to the first vehicle, and analysis of the images, for example.

At block 310, the method 300 includes modifying, using the computing device, a control strategy associated with a driving behavior of the first vehicle, based on the aggressive driving behavior of the second vehicle, the type of the second vehicle, and the distance between the first vehicle and the second vehicle. The control system of the first vehicle may support multiple control strategies and associated driving behaviors that may be predetermined or adaptive to changes in a driving environment of the vehicle. Generally, a control strategy may comprise sets of rules associated with traffic interactions in various driving contexts such as driving on a highway, for example. The control strategy may comprise rules that determine a speed of the first vehicle and a lane that the first vehicle may travel on while taking into account safety and traffic rules and concerns. The traffic concerns include, as examples, changes in road geometry, vehicles stopped at an intersection and windows-of-opportunity in yield situation, lane tracking, speed control, distance from other vehicles on the road, passing other vehicles, queuing in stop-and-go traffic, areas that may result in unsafe behavior such as oncoming-traffic lanes, aggressive drivers, etc. For instance, when a vehicle exhibiting aggressive driver behavior is identified, the computing device may be configured to modify or select a control strategy comprising rules for actions that control speed and location of the first vehicle to safely maintain a predetermined distance with the identified vehicle.

In an example, a first control strategy may comprise a default driving behavior, and a second control strategy may comprise a defensive driving behavior. Characteristics of a the defensive driving behavior may comprise, for example, following another vehicle, maintaining a predetermined safe distance away from the identified vehicle that may be larger than a distance maintained in the default driving behavior, turning-on lights, avoiding being in a blind spot of the identified vehicle, reducing a speed of the first vehicle, or stopping the first vehicle. When a given vehicle exhibits aggressive driving behavior and is identified by the computing device configured to control the first vehicle, the computing device may be configured to select the second driving behavior (e.g., the defensive driving behavior).

The distance between the first vehicle and the second vehicle (i.e., the vehicle exhibiting aggressive driving behavior) may influence the modification of the control strategy. If the second vehicle is close to the first vehicle, aggressive driving of the second vehicle may influence the control strategy of first vehicle more than if the second vehicle was farther away. Thus, alternatively or in addition to transition between discrete control strategies (e.g., the first control strategy and the second control strategy), the computing device may be configured to select from a continuum of driving modes or states based on the distance between the first vehicle and the second vehicle. The closer the second vehicle is to the first vehicle, the more defensive the control strategy chosen is, for example. Thus, the influence of the second vehicle on the control strategy of the first vehicle may be inversely proportional to the distance between the two vehicles.

In another example, the computing device may be configured to select a discrete control strategy, and also may be configured to select a driving mode from a continuum of driving modes within the selected discrete control strategy. In this example, a given control strategy may comprise multiple sets of driving rules, where a set of driving rules describe actions for control of speed and direction of the first vehicle. The computing device further may be configured to cause a smooth transition from a given set of driving rules to another set of driving rules of the multiple sets of driving rules, based on the distance between the two vehicles. A smooth transition may indicate that the transition from the given set of rules to another may not be perceived by a passenger in the vehicle as a sudden or jerky change in a speed or direction of the vehicle, for example.

In addition to taking into account the aggressive driving behavior of the second vehicle, the computing device may also take into account the type of the second vehicle. For example, if the second vehicle is a motorcycle, the computing device may take into account that the motorcycle may exhibit potentially more aggressive driving behavior than a truck. For instance, the computing device may be configured to take into account that the motorcycle may split lanes, and not conform to the lanes marked on the road. Lane splitting may refer to a two-wheeled vehicle moving between lanes of vehicles that are proceeding in the same direction. Thus, a given motorcycle that is splitting lanes may be moving between lanes at a speed greater than surrounding traffic. In this instance, the computing device may be configured to modify the control strategy to achieve a more defensive driving behavior than if the second vehicle is a car, for example.

In an example, a given control strategy may comprise a program or computer instructions that characterize actuators controlling the first vehicle (e.g., throttle, steering gear, brake, accelerator, or transmission shifter). The given control strategy may include action sets ranked by priority, and the action sets may include alternative actions that the first vehicle may take to accomplish a task (e.g., driving from one location to another). The alternative actions may be ranked based on manifestations of the aggressive driving of the second vehicle, the type of the second vehicle, and the distance between the first vehicle and the second vehicle.

In another example, multiple control strategies (e.g., programs) may continuously propose actions to the computing device. The computing device may be configured to decide which strategy may be selected or may be configured to modify the control strategy based on a weighted set of goals (safety, speed, etc.), for example. Weights of the weighted set of goals may be a function of the aggressive driving characteristics of the second vehicle, the type of the second vehicle, and/or the distance between the first vehicle and the second vehicle. Based on an evaluation of the weighted set of goals, the computing device, for example, may be configured to rank the multiple control strategies and respective action sets and select, or modify, a given strategy and a respective action set based on the ranking.

The computing device may include, be coupled to, or be in communication with a navigation and pathing system, such as the navigation and pathing system 148 described with respect to FIG. 1. Using the navigation and pathing system, the computing device may be configured to determine a driving path or trajectory for the first vehicle. The computing device may additionally be configured to update the trajectory dynamically while the first vehicle is in operation to take into account vehicles identified to exhibit aggressive driving behavior, the type of the identified vehicle, and distance between the first vehicle and the identified vehicles.

In some examples, the computing device may identify multiple vehicles exhibiting aggressive driving behavior. In these examples, the computing device may be configured to assign, based on respective characteristics of each identified vehicle, type of each vehicle, and distance between the first vehicle and each identified vehicle, a respective weight indicative of priority given to the respective vehicle. As an example for illustration, a motorcycle that is close to the first vehicle and swerving between lanes may be assigned a large weight than a distant car exceeding the speed limit ahead of the first vehicle. Thus, when modifying the control strategy of the first vehicle, the computing device may be configured to give the motorcycle more influence or weight. Also, based on respective weights assigned to the respective vehicles, the computing device may be configured to determine a modified trajectory that may be the safest trajectory given the presence of the respective vehicles exhibiting aggressive driving in the vicinity of the first vehicle. The computing device may also determine the modified trajectory based on the respective characteristics of the respective vehicles (e.g., type of a respective vehicle, distance from the first vehicle, etc.).

These examples and driving situations are for illustration only. Other examples and control strategies and driving behaviors are possible as well.

At block 312, the method 300 includes controlling, using the computing device, the first vehicle based on the modified control strategy. In an example, the computing device may be configured to control actuators of the first vehicle using an action set or rule set associated with the modified control strategy. For instance, the computing device may be configured to adjust translational velocity, or rotational velocity, or both, of the vehicle based on the modified driving behavior.

Figure 4A:
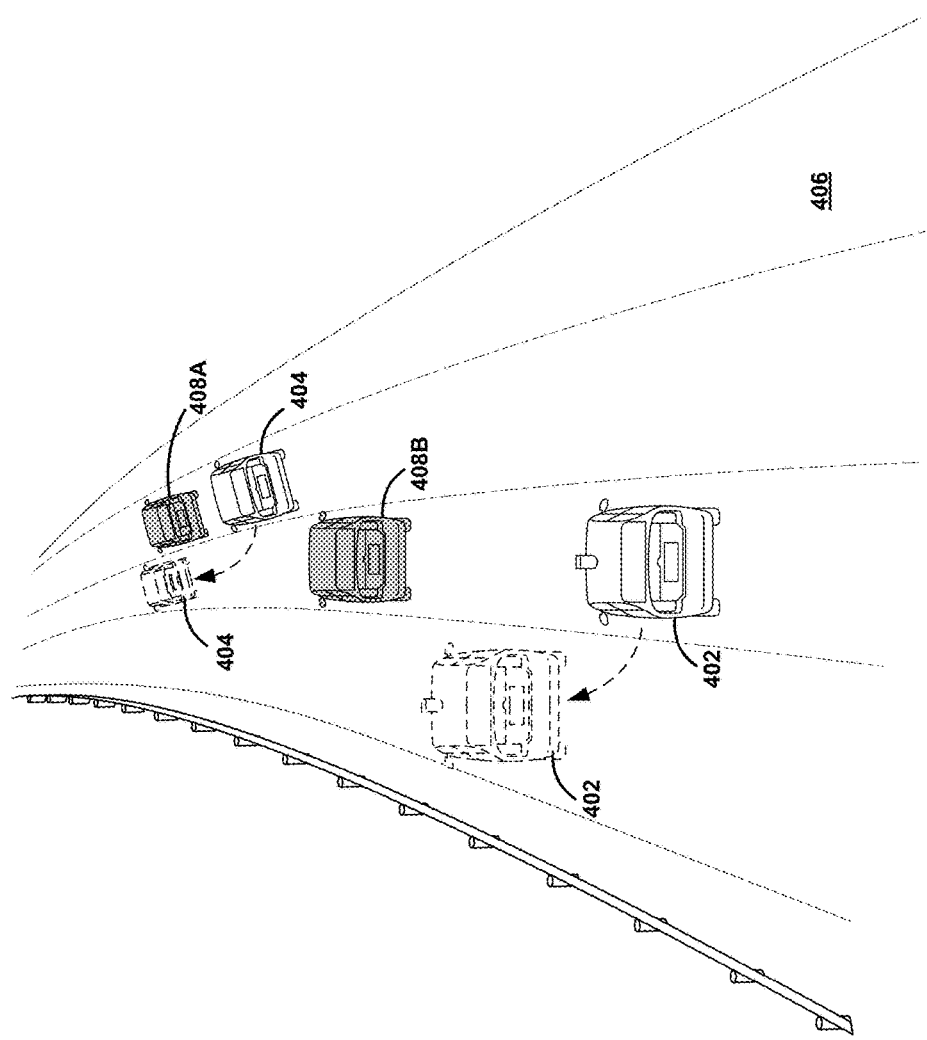
FIG. 4A illustrates an example of controlling a first vehicle based on a modified control strategy in response to identifying a second vehicle exhibiting aggressive driving behavior, in accordance with an example embodiment.
Figure 4B:
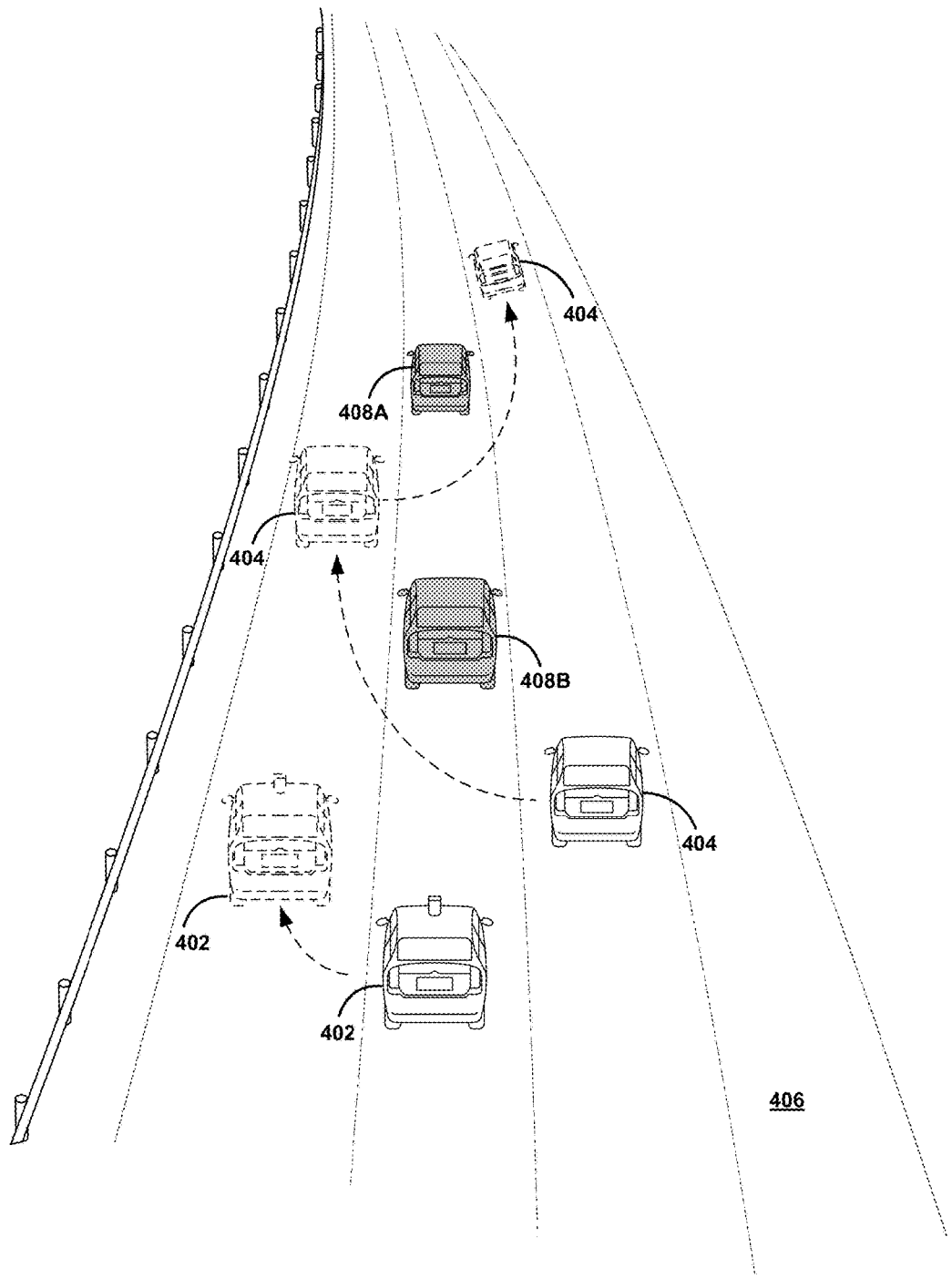
FIG. 4B illustrates another example of controlling the first vehicle based on a modified control strategy in response to identifying the second vehicle exhibiting aggressive driving behavior, in accordance with an example embodiment.

FIGS. 4A-4B illustrate examples of controlling a first vehicle 402 based on a modified control strategy in response to identifying a second vehicle 404 exhibiting aggressive driving behavior, in accordance with example embodiments. FIG. 4A illustrates both vehicles 402 and 404 travelling on a road 406. The vehicle 404 may be following another vehicle 408A closely (e.g., within a threshold distance from the vehicle 408A) and a driver of the vehicle 404 may be excessively using the horn, for example. A microphone, such as the microphone 156 in FIG. 1, may be coupled to the first vehicle and in communication with the computing device. The computing device may receive, through the microphone, audio signals indicative of a sound of the horn of the vehicle 404, for example. The computing device may analyze the audio signals, and determine whether the use of the horn of the vehicle 404 is excessive, i.e., horn is used repeatedly for a threshold number of times within a given period of time. Another vehicle 408B may be on a lane to the left of the lane of the vehicles 404 and 408A, but close to the vehicle 404 as illustrated in FIG. 4A. Further, the vehicle 404 may move to the left lane in front of the vehicle 408B and accelerate past the vehicle 408A. The computing device, configured to control the vehicle 402, may identify and designate, based on information received from sensor systems coupled to the vehicle 402, the behavior of the vehicle 404 as an aggressive driving behavior. Accordingly, the computing device may be configured to cause the vehicle 402 to slow down and move to the leftmost lane as a safer lane given the aggressive driving behavior of the vehicle 404.

FIG. 4B illustrates another driving situation where the vehicle 404 is exhibiting an aggressive driving behavior. In FIG. 4B, the vehicle 404 is zigzagging (proceeding by sharp turns in alternative directions between the vehicles 402, 408A, and 408B). The computing device, configured to control the vehicle 402, may identify and designate, based on information received from sensor systems coupled to the vehicle 402, the zigzagging behavior of the vehicle 404 as an aggressive driving behavior. Accordingly, the computing device may be configured to cause the vehicle 402 to slow down and change lanes given the aggressive driving behavior of the vehicle 404.

These control actions and driving situations are for illustration only. Other actions and situations are possible as well. In one example, the computing device may be configured to control the vehicle based on the modified control strategy as an interim control until a human driver can take control of the vehicle.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4B. Thus, for example, referring to the embodiments shown in FIG. 3, one or more features of blocks 302-312 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4B may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, by a computing device, from one or more sensors coupled to a first vehicle, sensor information indicative of one or more respective characteristics of vehicles on a road of travel of the first vehicle, wherein the computing device is configured to control the first vehicle in an autonomous operation mode;
identifying, from the vehicles, based on the one or more respective characteristics, a second vehicle that exhibits an aggressive driving behavior indicative of one or more driving actions that increase a risk of the second vehicle causing a road accident, wherein identifying the second vehicle includes determining a type of the second vehicle;
estimating, by the computing device, a distance between the first vehicle and the second vehicle;
monitoring, by the computing device, lane changing patterns performed by the second vehicle and respective distances maintained by the second vehicle relative to other vehicles on the road of travel;
assigning, by the computing device, to the second vehicle, a weight, such that a magnitude of the weight increases when the second vehicle changes lanes above a threshold frequency, increases as the estimated distance between the first vehicle and the second vehicle decreases, decreases as distances maintained by the second vehicle relative to other vehicles increases, and increases with aggressiveness of a driving behavior corresponding to the type of the second vehicle;
performing a comparison between the weight assigned to the second vehicle and respective weights assigned to one or more other vehicles on the road of travel;
modifying, using the computing device, a control strategy associated with the driving behavior of the first vehicle, wherein the modification is based on the magnitude of the weight assigned to the second vehicle, the comparison, the one or more respective characteristics of vehicles on the road of travel of the first vehicle, and traffic rules associated with the road of travel of the first vehicle; and
controlling, using the computing device, the first vehicle based on the modified control strategy.

2. The method of claim 1, wherein the aggressive driving behavior comprises one of exceeding a speed limit, lane changing at a frequency exceeding a first threshold frequency, failing to signal intent to pass another vehicle, tailgating another vehicle, using a horn at a frequency exceeding a second threshold frequency, and flashing headlights at a frequency exceeding a third threshold frequency.

3. The method of claim 1, wherein receiving the sensor information comprises:
receiving, from an image-capture device coupled to the first vehicle, an image, wherein identifying the second vehicle comprises identifying the object in the image, and wherein the image-capture device is one of a camera or a light detection and ranging (LIDAR) device.

4. The method of claim 1, wherein the respective characteristics of the second vehicle include a longitudinal speed of the second vehicle, a lateral speed of the second vehicle, a direction of motion of the second vehicle, a size of the second vehicle, a respective position of the second vehicle on the road, trajectory of the second vehicle, and acceleration or deceleration of the second vehicle.

5. The method of claim 4, further comprising:
receiving one or more of LIDAR-based information from a LIDAR device coupled to the first vehicle or an image of the second vehicle captured by a camera coupled to the first vehicle, wherein the LIDAR-based information comprises a three-dimensional (3D) point cloud that includes a set of points based on light emitted from the LIDAR device and reflected from the second vehicle;
receiving, from a radio detection and ranging (RADAR) device coupled to the first vehicle, RADAR-based information relating to one or more respective motion characteristics of the second vehicle; and
determining the one or more respective characteristics of the first vehicle based on the one or more of the LIDAR-based information and the image, and the RADAR-based information.

6. The method of claim 1, wherein controlling the first vehicle based on the modified control strategy comprises one or more of: (i) reducing a speed of the first vehicle, (ii) maintaining a predetermined safe distance from the second vehicle, (iii) changing lanes to move away from the second vehicle, and (iv) stopping the first vehicle.

7. The method of claim 1, wherein controlling the first vehicle based on the modified control strategy comprises determining a desired path of the first vehicle, wherein determining the desired path of the vehicle takes into account the aggressive driving behavior of the second vehicle and the assigned weight indicative of the degree of influence of the aggressive driving behavior of the second vehicle on the driving behavior of the first vehicle.

8. A non-transitory computer readable medium having stored thereon instructions executable by a computing device to cause the computing device to perform functions comprising:
  receiving, from one or more sensors coupled to a first vehicle, sensor information indicative of one or more respective characteristics of vehicles on a road of travel of a first vehicle;
  identifying, from the vehicles, based on the one or more respective characteristics, a second vehicle that exhibits an aggressive driving behavior indicative of one or more driving actions that increase a risk of the second vehicle causing a road accident, wherein identifying the second vehicle includes determining a type of the second vehicle;
  estimating a distance between the first vehicle and the second vehicle;
  monitoring lane changing patterns performed by the second vehicle and respective distances maintained by the second vehicle relative to other vehicles on the road of travel;
  assigning to the second vehicle, a weight, such that a magnitude of the weight increases when the second vehicle changes lanes above a threshold frequency, increases as the estimated distance decreases, decreases as distances maintained by the second vehicle relative to other vehicles increases, and increases with aggressiveness of a driving behavior corresponding to the type of the second vehicle;
  performing a comparison between the weight assigned to the second vehicle and respective weights assigned to one or more other vehicles on the road of travel;
  modifying a control strategy associated with a driving behavior of the first vehicle, wherein the modification is based on the magnitude of the weight assigned to the second vehicle, the comparison, the one or more respective characteristics of vehicles on the road of travel of the first vehicle, and traffic rules associated with the road of travel of the first vehicle; and
  controlling the first vehicle based on the modified control strategy.

9. The non-transitory computer readable medium of claim 8, wherein the aggressive driving behavior comprises one of exceeding a speed limit, lane changing at a frequency exceeding a first threshold frequency, failing to signal intent to pass another vehicle, tailgating another vehicle, using a horn at a frequency exceeding a second threshold frequency, and flashing headlights at a frequency exceeding a third threshold frequency.

10. The non-transitory computer readable medium of claim 8, wherein the function of receiving the sensor information comprises:
  receiving, from an image-capture device coupled to the first vehicle, an image, wherein identifying the second vehicle comprises identifying the object in the image, and wherein the image-capture device is one of a camera or a light detection and ranging (LIDAR) device.

11. The non-transitory computer readable medium of claim 8, wherein the respective characteristics of the second vehicle include a longitudinal speed of the second vehicle, a lateral speed of the second vehicle, a direction of motion of the second vehicle, a size of the second vehicle, a respective position of the second vehicle on the road, trajectory of the second vehicle, and acceleration or deceleration of the second vehicle.

12. The non-transitory computer readable medium of claim 11, wherein the functions further comprise:
  receiving one or more of LIDAR-based information from a LIDAR device coupled to the first vehicle or an image of the second vehicle captured by a camera coupled to the first vehicle, wherein the LIDAR-based information comprises a three-dimensional (3D) point cloud that includes a set of points based on light emitted from the LIDAR device and reflected from the second vehicle;
  receiving, from a radio detection and ranging (RADAR) device coupled to the first vehicle, RADAR-based information relating to one or more respective motion characteristics of the second vehicle; and
  determining the one or more respective characteristics of the first vehicle based on the one or more of the LIDAR-based information and the image, and the RADAR-based information.

13. The non-transitory computer readable medium of claim 8, wherein the function of controlling the first vehicle based on the modified control strategy comprises one or more of: (i) reducing a speed of the first vehicle, (ii) maintaining a predetermined safe distance from the second vehicle, (iii) changing lanes to move away from the second vehicle, and (iv) stopping the first vehicle.

14. The non-transitory computer readable medium of claim 8, wherein the computing device is configured to control the first vehicle in an autonomous operation mode.

15. A control system comprising:
  one or more sensors coupled to a first vehicle;
  at least one processor in communication with the one or more sensors; and
  a memory having stored thereon instructions that, upon execution by the at least one processor, cause the control system to perform functions comprising:
    receiving, from the one or more sensors, sensor information indicative of one or more respective characteristics of vehicles on a road of travel of the first vehicle;
    identifying, from the vehicles, based on the one or more respective characteristics, a second vehicle that exhibits an aggressive driving behavior indicative of one or more driving actions that increase a risk of the second vehicle causing a road accident, wherein identifying the second vehicle includes determining a type of the second vehicle;
    estimating a distance between the first vehicle and the second vehicle;
    monitoring lane changing patterns performed by the second vehicle and respective distances maintained by the second vehicle relative to other vehicles on the road of travel;
    assigning to the second vehicle, a weight, such that a magnitude of the weight increases when the second vehicle changes lanes above a threshold frequency, increases as the estimated distance decreases, decreases as distances maintained by the second vehicle relative to other vehicles increases, and increases with aggressiveness of a driving behavior corresponding to the type of the second vehicle;

performing a comparison between the weight assigned to the second vehicle and respective weights assigned to one or more other vehicles on the road of travel;

modifying a control strategy associated with a driving behavior of the first vehicle, wherein the modification is based on the magnitude of the weight assigned to the second vehicle, the comparison, the one or more respective characteristics of vehicles on the road of travel of the first vehicle, and traffic rules associated with the road of travel of the first vehicle; and controlling the first vehicle based on the modified control strategy.

16. The control system of claim 15, wherein the aggressive driving behavior comprises one of exceeding a speed limit, lane changing at a frequency exceeding a first threshold frequency, failing to signal intent to pass another vehicle, tailgating another vehicle, using a horn at a frequency exceeding a second threshold frequency, and flashing headlights at a frequency exceeding a third threshold frequency.

17. The control system of claim 15, wherein the function of receiving the sensor information comprises:

receiving, from an image-capture device coupled to the first vehicle, an image, wherein identifying the second vehicle comprises identifying the object in the image, and wherein the image-capture device is one of a camera or a light detection and ranging (LIDAR) device.

18. The control system of claim 15, wherein the respective characteristics of the second vehicle include a longitudinal speed of the second vehicle, a lateral speed of the second vehicle, a direction of motion of the second vehicle, a size of the second vehicle, a respective position of the second vehicle on the road, trajectory of the second vehicle, and acceleration or deceleration of the second vehicle.

19. The control system of claim 18, further comprising:

a LIDAR device coupled to the first vehicle and configured to provide LIDAR-based information comprising a three-dimensional (3D) point cloud that includes a set of points based on light emitted from the LIDAR device and reflected from the second vehicle;

a camera coupled to the first vehicle and configured to provide an image of the second vehicle; and a radio detection and ranging (RADAR) device coupled to the first vehicle and configured to provide RADAR-based information relating to one or more respective motion characteristics of the second vehicle, wherein the functions further comprise determining the one or more respective characteristics of the first vehicle based on the one or more of the LIDAR-based information and the image, and the RADAR-based information.

20. The control system of claim 15, wherein the function of controlling the first vehicle based on the modified control strategy comprises one or more of: (i) reducing a speed of the first vehicle, (ii) maintaining a predetermined safe distance from the second vehicle, (iii) changing lanes to move away from the second vehicle, and (iv) stopping the first vehicle.

* * * * *